Figure 3:
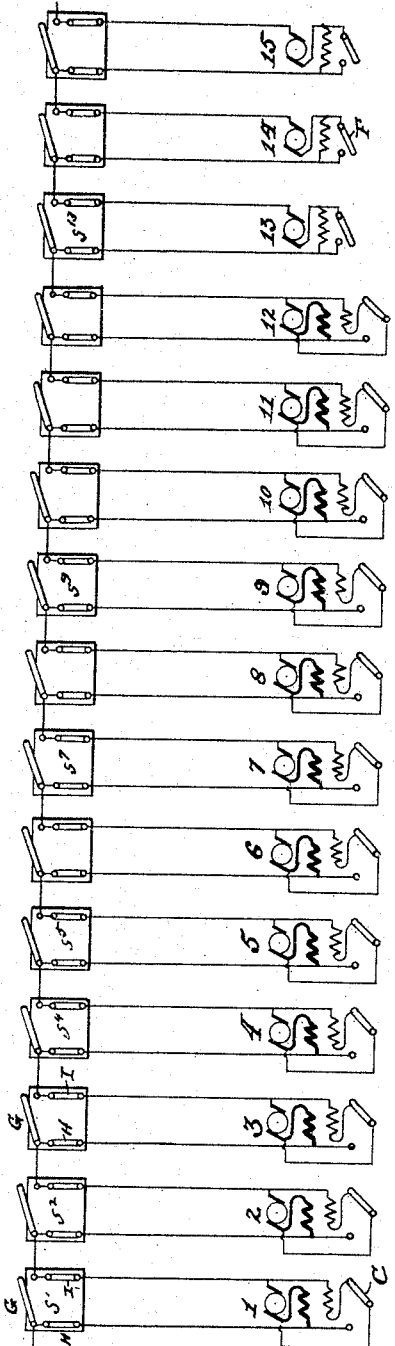

(No Model.) 3 Sheets—Sheet 1.
C. S. BRADLEY.
ELECTRICAL TRANSMISSION OF POWER.
No. 491,465. Patented Feb. 7, 1893.
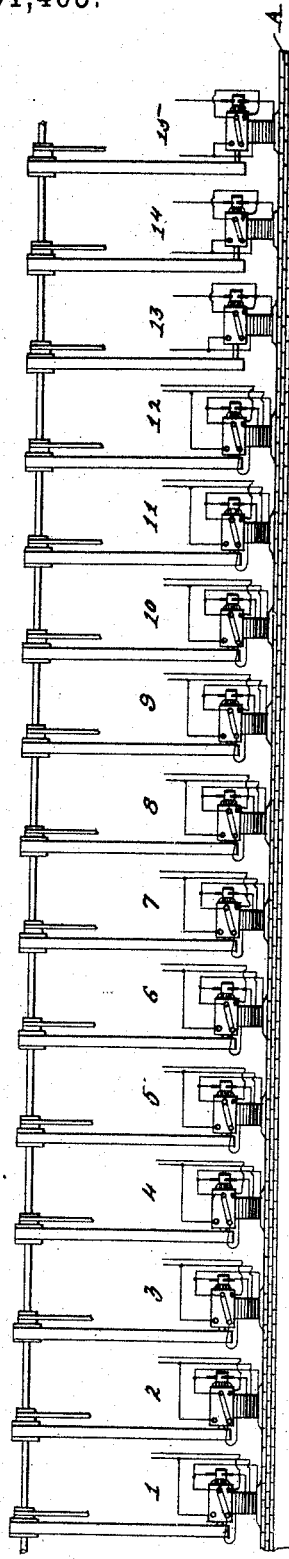
*Fig. 1.* Generator Station.
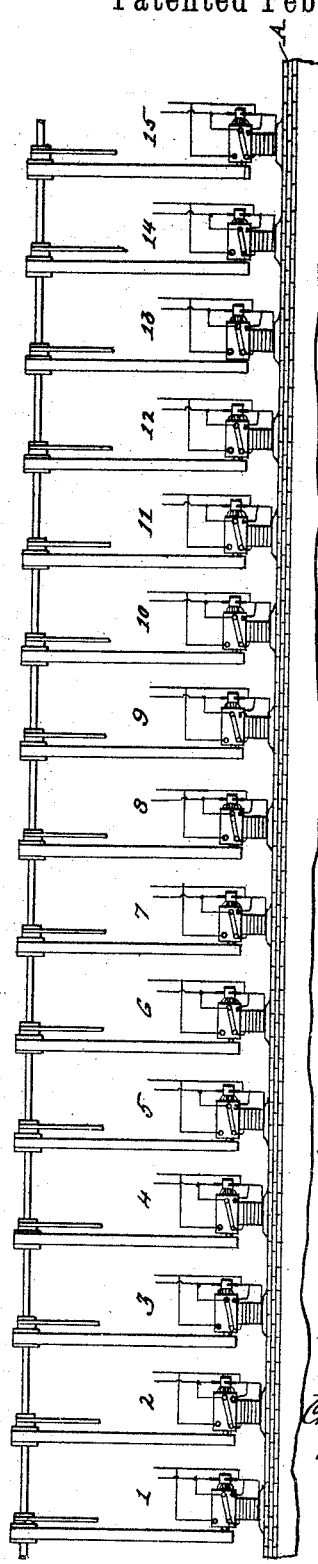
*Fig. 2.* Motor Station.
Attest:
C. W. Benjamin.
E. C. Grigg.
Inventor:
Charles S. Bradley
by Reed & Priae
his Attorneys (No Model.)  3 Sheets—Sheet 2.

C. S. BRADLEY.
ELECTRICAL TRANSMISSION OF POWER.

No. 491,465. Patented Feb. 7, 1893.

Generator Station.

Motor Station.

Attest:
C. W. Benjamin
E. C. Grigg

Inventor:
Charles S. Bradley
by Read & Price
his attorneys.

(No Model.) 3 Sheets—Sheet 3.
C. S. BRADLEY.
ELECTRICAL TRANSMISSION OF POWER.
No. 491,465. Patented Feb. 7, 1893.
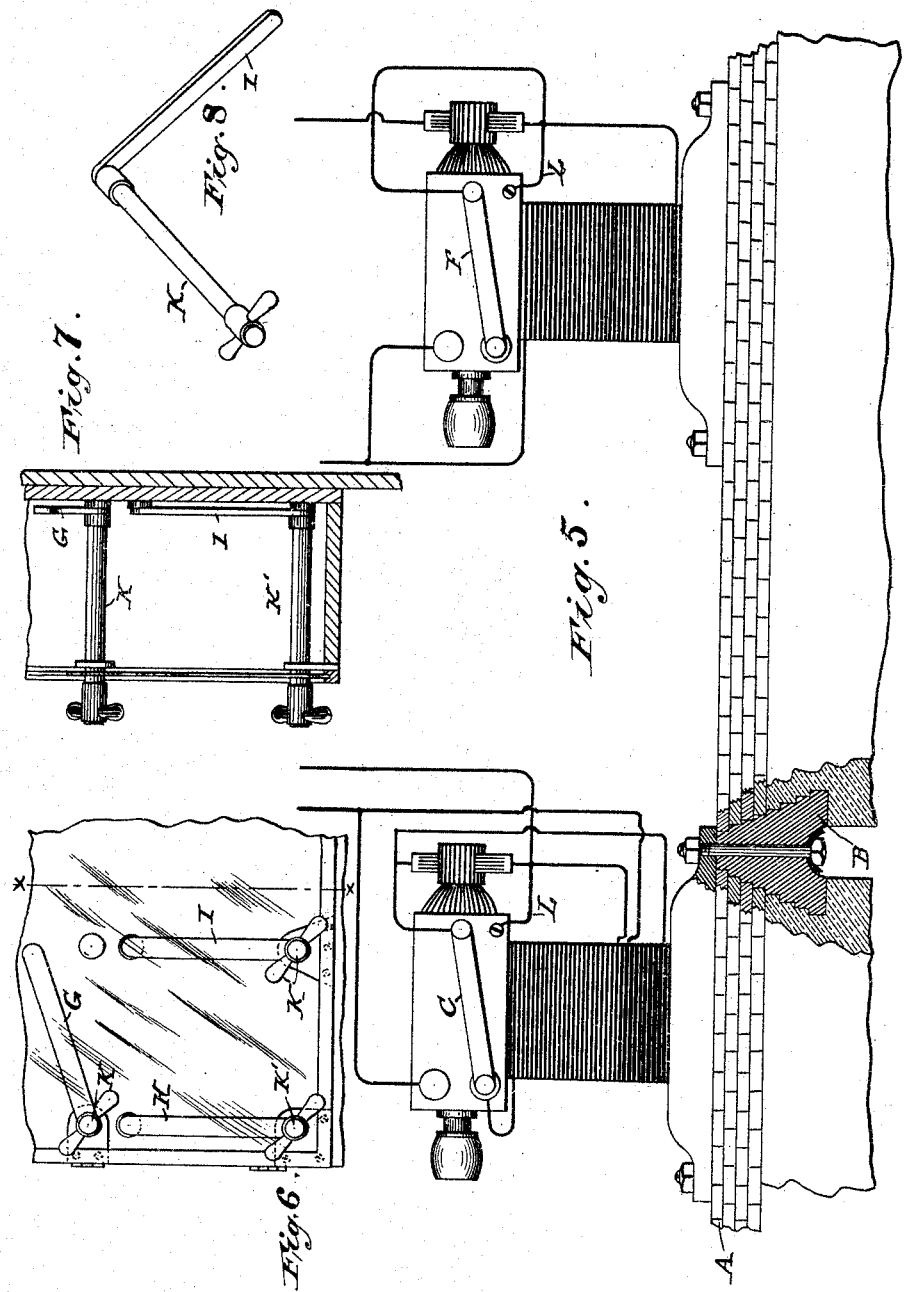
Attest:
C. H. Benjamin
E. C. Grigg.
Inventor:
Charles S. Bradley
by Read & Price
his Attorneys.

UNITED STATES PATENT OFFICE.

CHARLES S. BRADLEY, OF AVON, NEW YORK.

ELECTRICAL TRANSMISSION OF POWER.

SPECIFICATION forming part of Letters Patent No. 491,465, dated February 7, 1893.

Application filed April 4, 1892. Serial No. 427,587. (No model.)

*To all whom it may concern:*

Be it known that I, CHARLES S. BRADLEY, a citizen of the United States, residing at Avon, in the county of Livingston and State of New York, have invented certain new and useful Improvements in Electric Transmission of Power; and I do hereby declare the following to be a full, clear, and exact description of the invention, such as will enable others skilled in the art to which it appertains to make and use the same.

This invention relates to electric transmission of power over long distances by direct currents. Transmission of power by direct currents has heretofore been limited to short distances, for the reason that the electric potential necessary to overcome the resistance of long lines is destructive to commutators and the insulation of the machines could not successfully withstand high voltage, and as no mode of dynamically generating continuous electric currents of high tension without the use of a commutator has yet been discovered, large conductors must be used in order to economically convey the low tension currents. The great expense of the conductors has rendered it commercially impossible to use direct current machines for long distances. The advantages of a direct current system in which high potentials could be transmitted are striking in that the efficiency of both generator and motor is very high and a very large return of the power expended at the transmitting station could be recovered at the delivery station; and high potentials permit the use of small line conductors without great losses.

It is the object of my invention to organize a system in which direct currents may be used and high potentials transmitted.

To that end the invention involves placing a large number of generators in series relation and thoroughly insulating them both from earth and from one another and transmitting the combined electro-motive-force of all the machines to line. By such an arrangement the difference of potential across any pair of brushes is only that due to the electro-motive-force developed by a single armature, and by making this electro-motive-force of a degree which can be safely withstood by a commutator the objectionable feature hereinbefore noted is overcome.

The invention comprises a number of generators or motors or motors and generators coupled in series relation, all being highly insulated, the frames of the machines being brought to a potential approximating that of any part of the winding so as to insure the safety of the insulation.

The invention comprises other features which will be more particularly hereinafter described and the novelty of which will be hereinafter indicated in the appended claims.

Figure 4:
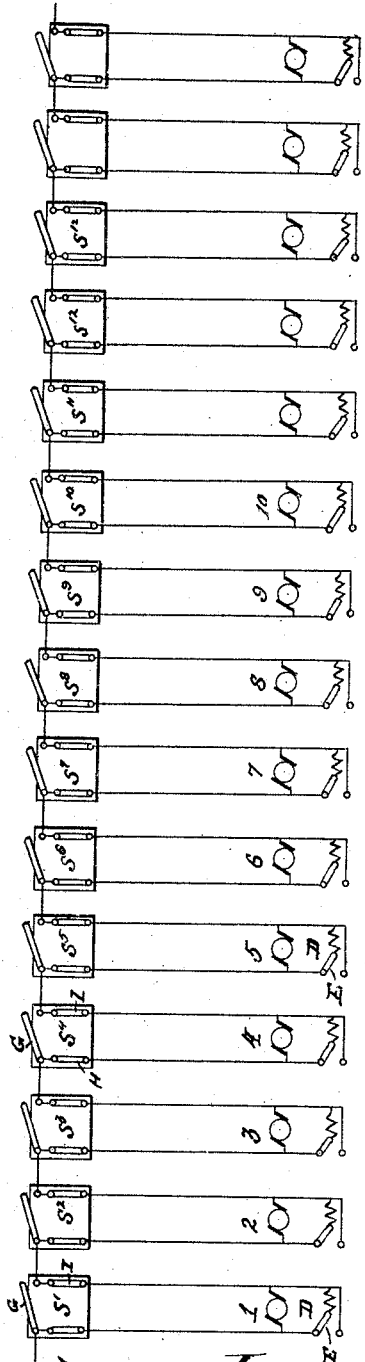

In the accompanying drawings which illustrate the invention, Figure 1 illustrates a series of generators all actuated by a single shaft and thoroughly insulated from ground and from each other; Fig. 2 illustrates a series of motors similarly arranged and all acting upon a single driven shaft; Fig. 3 is a diagrammatic illustration showing a mode of coupling the generators, and the switches for cutting them out, showing also the arrangement of the generator circuits; Fig. 4 is a diagram showing a similar arrangement for the motor station; Fig. 5 shows in enlarged view the details of mounting the generators or motors, the left hand portion of the figure showing a compounded machine used at the generating station, and the right hand portion showing a simple series machine; Fig. 6 illustrates a detail of a switch for cutting in or out the motors or generators; Figs. 7 and 8 are further details of the switch.

As shown in the drawings fifteen generators and fifteen motors are connected in series relation. A larger number might be used if greater electro-motive-force were desired. Supposing that each armature delivered a current of five hundred volts, the whole number of machines would deliver a current of seven thousand five hundred volts. The difference of potential between the brushes of machine No. 1 would then be five hundred volts, and the left hand brush of machine No. 2 would have a potential of five hundred volts, while the right hand brush of machine No. 2 would have a potential of one thousand; in machine No. 4 the left hand brush would have a potential of fifteen hundred, the right hand brush a potential of two thousand, and so on through the series. It will thus be seen that the difference of potential between the brushes of any generator is simply five hundred volts, while the difference of potential of the line terminals connected respectively with the positive brush of one terminal machine and the negative brush of the other will be fifteen times five hundred or seven thousand five hundred volts. The line terminals are connected with a series of motors arranged also in series relation, so that supposing a potential of seven thousand five hundred volts to be delivered at the left hand brush of motor No. 1, if the counter-electro-motive-force of its armature were five hundred volts the potential of the right hand brush would be seven thousand, so that the drop of potential between the brushes would be only five hundred volts; and so with the other motors of the series, but a fractional drop of the entire electro-motive-force occurring in any motor, which the commutator can easily be made to withstand. While such provision enables the machines to be operated with safety to the commutator the connections to the machines are at a very high potential, dangerous to human life and it is necessary in order to make the system commercially feasible that means should be provided for thoroughly insulating the system so that an attendant in controlling or repairing the machines will be subjected to no risk of shock. To this end each entire machine is thoroughly insulated from ground and the machines are preferably set apart a sufficient distance so that an attendant in moving about them can by no possibility come in contact with parts of two or more machines at the same time. The foundation is preferably formed of glass brick cemented together by sulphur or some other insulating and non-hydroscopic cement, forming a highly insulated flooring which an attendant must mount before he can touch any machine. Such a foundation is shown at A in Fig. 5. The bolts or other anchoring devices by which the bed plates of the machines are secured in position pass through glass insulators B anchored in the foundation walls. The glass flooring should be given a sufficient area to prevent possibility of leakage by reason of moisture deposited on its surface. The several machines are connected with the common shaft with which they co-operate by insulating belts, thus providing against any discharge of potential between the machines except over the connecting wire. It is very desirable to provide against breaking down the insulation of the windings in case of accidental grounding of the frame of a machine. The frame of each machine is therefore placed in good electric connection with one of its brushes, as indicated at L, so that the dielectric strain on the insulation can at no point of the winding be greater than the voltage of a single machine. In case a ground occurs an easy path to earth will exist from a brush which will result in blowing a line fuse but cannot disable a machine. A very important incident of this construction is that the wire insulation need not be made higher than to withstand the voltage of a single machine. Moreover the attendant if by accident he touches a brush and the frame of the machine simultaneously will be affected by the voltage of a single machine only. Each machine is provided with a number of switches for regulating or cutting it in or out of circuit. The regulating switch may open or short circuit the field-magnet circuit and may be mounted on the machine, while the controlling switch is adapted to short circuit the entire machine when it is desired to repair it or when it becomes necessary to handle the metallic parts. This controlling switch is mounted at some distance from the machine and highly insulated. At the generating station I prefer to use chiefly compound-wound dynamo electric machines, thus rendering the system self-regulating and delivering a constant potential and a current suitable to the load. A few series-wound machines are included at the generating station in addition to the compound-wound machines, thus tending still further to make the electro-motive-force delivered constant. The motors are preferably all shunt wound and provided with a switch for first opening the shunt circuit and then short circuiting the armature, D representing the field-magnet winding and E the switch for opening the field-magnet circuit and closing the short circuit around the armature, see Fig. 4. The series generators as indicated in Fig. 3, machine 14, at F, and in Fig. 5, are provided with a switch for short circuiting the field-magnet circuits.

The compound-wound generators are provided with a switch C, see Figs. 3 and 5, by which the shunt circuit on the field-magnet may be first opened and the series coils then short circuited. In the positions shown in Figs. 3 and 5 both the series and shunt windings are active. When the switch is thrown the shunt winding will be opened and when it reaches the other contact the series coils will be short circuited. The line switches as indicated in Figs. 3 and 4 are mounted upon switch boards S', S², S³, &c., a switch lever G enabling any motor or generator to be short circuited and switch levers H, I, permitting both sides of the line to be entirely disconnected from the motor. The switch board should be highly insulated and is preferably inclosed in a glass casing, as indicated in Figs. 6 and 7, a glass or other insulating stem K, K', projecting through the glazing and being provided with handles by which the switches may be thrown. The motors and generators are as before stated belted or otherwise connected with a single shaft so as to equalize the effect of fluctuations in load upon all of the machines.

The battery of generators and motors will preferably be located at single terminal stations and the power delivered by the common motor shaft may be applied to the operation of a large distribution plant, or may drive low tension dynamo electric machines for any desired number of distribution circuits. The battery of machines at each station thus acts as a unit. I am thus enabled to raise the tension of a direct current to a point by which it may be made to economically traverse long distances and can then be converted into power.

As the efficiency of direct current dynamo electric machine and motors may be made ninety-six per cent. it will be seen that excluding the heating losses in overcoming the resistance of the line the efficiency of such a system would be ninety-two per cent. at the motor shaft, or allowing for another conversion by means of low tension generators and motors eighty-five per cent.

I desire to have it understood that parts of this invention as herein described may be used without other parts; for example, although I have described the system as composed of a certain number of generators and motors acting as units at two stations, and co-operating with a shaft common to all of the generators or all of the motors, it is possible to have part of the generators acted upon by one shaft and part by another, and all of the motors act upon a common shaft, or to have the motors act upon independent shafts. The mode herein described is, however, the preferable, when its adoption is available.

Having thus described my invention what I claim as new and desire to secure by Letters Patent is:—

1. A system for electrically transmitting power by direct current comprising a multiplicity of generators coupled in series relation, and highly insulated from earth, a series of motors similarly arranged, a connecting line, and a highly insulated flooring or platform about the machines, upon which an attendant must stand to gain access to any machine.

2. A generating station for high tension direct current comprising a multiplicity of generators coupled in series and highly insulated from earth, and a highly insulated floor over which an attendant must pass to gain access to a machine, the several machines being highly insulated from each other and spaced a sufficient distance apart to prevent an attendant establishing accidental connection between them.

3. A system of apparatus for generating and transmitting a direct electric current of high electro-motive-force, comprising a multiplicity of generators coupled in series relation and highly insulated from earth, the winding of each generator being electrically connected with its frame.

4. A system of apparatus for transforming a high potential direct electric current into mechanical energy, comprising a multiplicity of motors coupled in series relation and highly insulated from earth, the winding of each motor being electrically connected with its frame.

5. A system of apparatus for electrically transmitting power by direct electric current, comprising a multiplicity of generators coupled in series relation and highly insulated from earth, the winding of each generator being electrically connected with its frame, a multiplicity of motors in circuit with the generators, said motors being coupled in series relation and highly insulated from earth, the winding of each motor being electrically connected with its frame.

6. A system for electrically transmitting power by direct current comprising a multiplicity of generators coupled in series relation and connected with a common driving shaft, a series of motors similarly arranged, and a controlling switch for short circuiting any machine, said switch being highly insulated and located at a sufficient distance from any machine to prevent an attendant forming an accidental contact between the machine and any part of the switch.

7. A battery of direct current dynamo electric machines or motors coupled in series mounted upon a floor of glass or other insulating material, said floor surrounding the machines for the purpose described, the several machines being spaced a sufficient distance apart to prevent an attendant from forming an accidental contact with any two machines simultaneously.

In testimony whereof I affix my signature in presence of two witnesses.

CHARLES S. BRADLEY.

Witnesses:
   A. L. SEARLES,
   F. S. HUNTING.